March 30, 1926.
E. C. HAMILTON ET AL
1,578,726
METHOD OF TRANSFERRING AND TRANSPORTING ARTICLES AND COMMODITIES
Filed Nov. 10, 1923   3 Sheets-Sheet 1
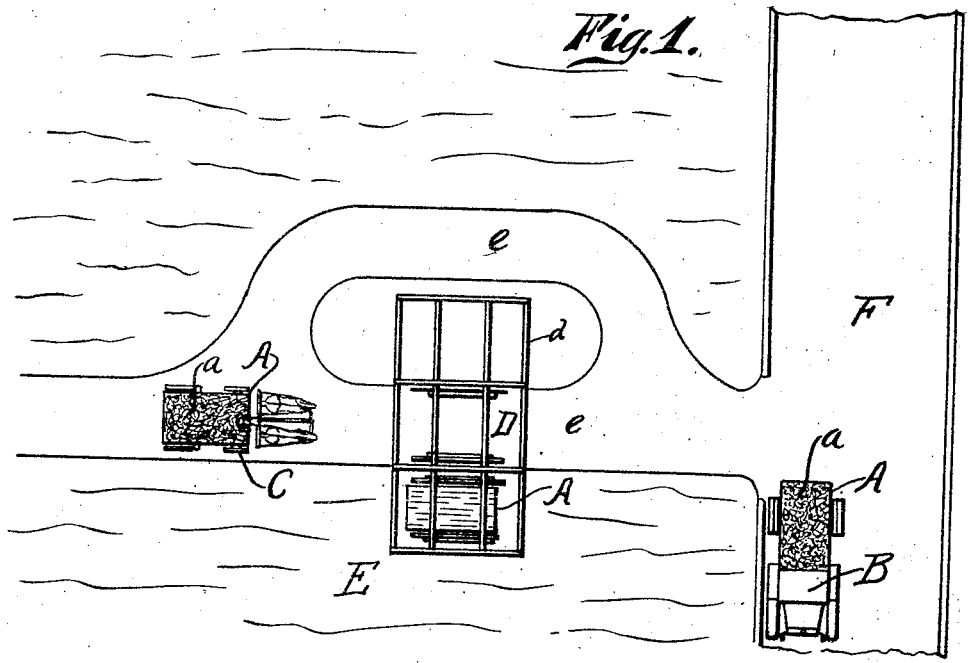
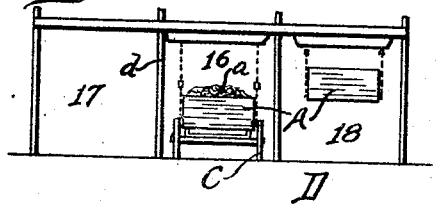
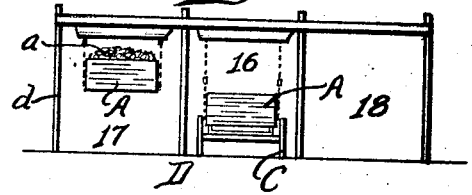
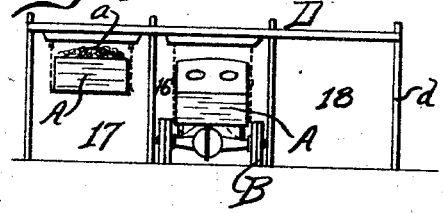
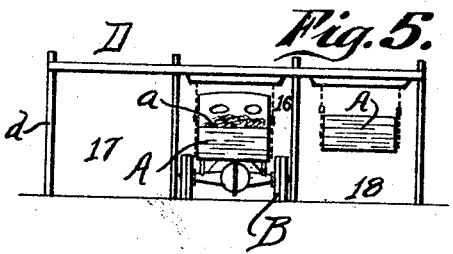
INVENTORS,
Ernest C. Hamilton
BY and William C. Poe;
ATTORNEYS

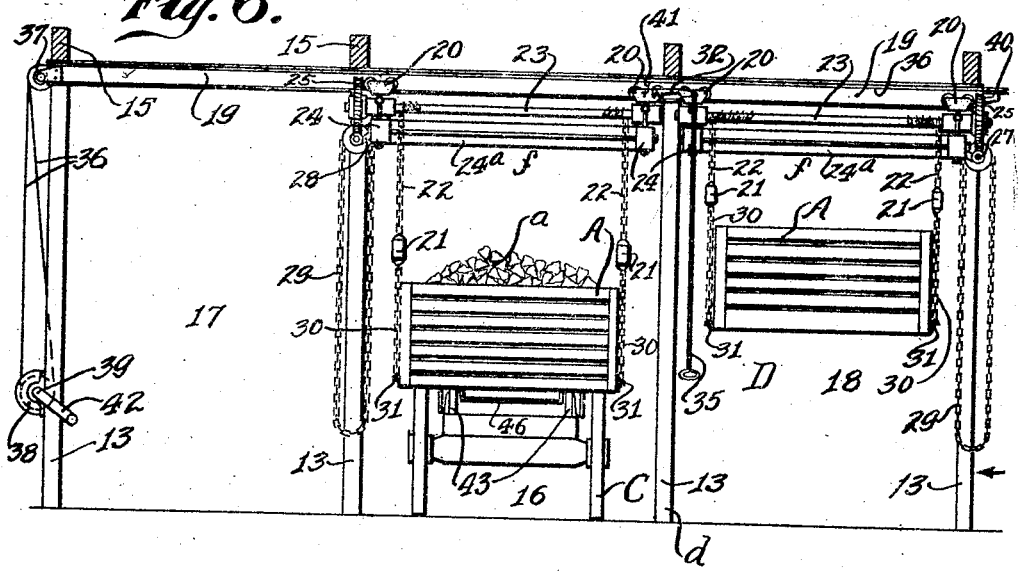
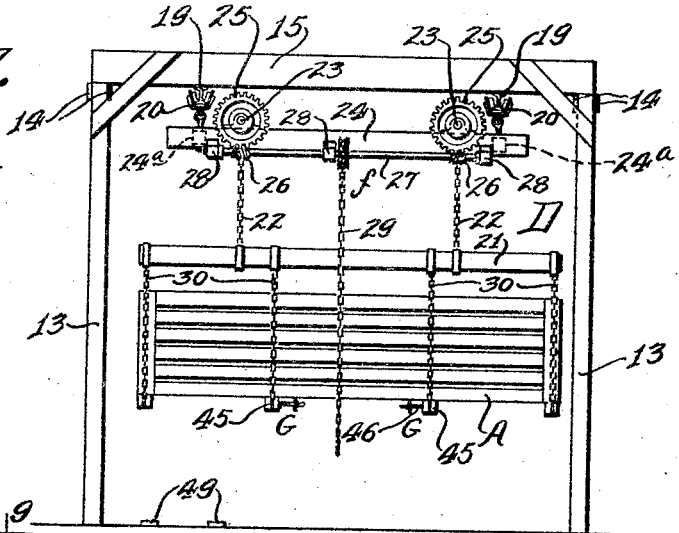
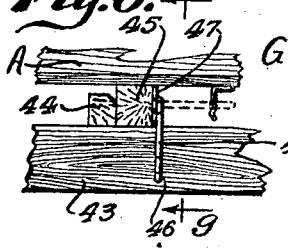

March 30, 1926.

E. C. HAMILTON ET AL.

1,578,726

METHOD OF TRANSFERRING AND TRANSPORTING ARTICLES AND COMMODITIES

Filed Nov. 10, 1923   3 Sheets-Sheet 3

INVENTORS,
Ernest C. Hamilton,
and William C. Poe;
BY
ATTORNEYS.

Patented Mar. 30, 1926.

1,578,726

UNITED STATES PATENT OFFICE.

ERNEST C. HAMILTON AND WILLIAM C. POE, OF LOS ALAMITOS, CALIFORNIA.

METHOD OF TRANSFERRING AND TRANSPORTING ARTICLES AND COMMODITIES.

Application filed November 10, 1923. Serial No. 673,932.

*To all whom it may concern:*

Be it known that we, ERNEST C. HAMILTON and WILLIAM C. POE, citizens of the United States, residing at Los Alamitos, in the county of Orange and State of California, have jointly invented new and useful Improvements in Methods of Transferring and Transporting Articles and Commodities, of which the following is a specification.

This invention relates to a method of transporting commodities from a point of origin to destination, and more particularly articles of a perishable nature.

A primary object of the invention is to provide a method of handling the articles or commodities with facility thereby effecting substantial economies in time, control and manipulation, and convenience in the use and service of the vehicles employed. In that connection the invention aims to provide a method of transporting commodities, such as for example field-grown products which may be transported in vehicles of different type in such a way that the operation of each vehicle is confined to its particular zone, whereby maximum efficiency of the vehicles of different classes is obtained.

A further object of the invention is to provide a method which makes it possible to transfer the product while in transit, whereby the loaded container is enabled to make a through run from the point of origin to destination without unloading, thereby preventing the deterioration of the product while in transit and requiring no preserving medium therefor.

In the drawings:

Figure 1 is a conventional plan view of part of a beet field and part of the highway adjoining, showing also a loaded highway truck and a loaded field horse-drawn wagon, and transfer means positioned upon the field adjacent the highway, all in accordance with one embodiment and practice of the invention; and the transfer means are more or less diagrammatically shown;

Figures 2, 3, 4 and 5 are further mainly diagrammatic views showing the transfer means illustrated in Figure 1, with vehicles or conveyances in positions taken in the acts of transference; Figure 2 shows a field wagon in position for removal of its filled body, an empty body being available for substitution; Figure 3 shows the filled body removed and shifted to one side and the empty body in position on the field wagon; Figure 4 shows a highway truck in position to be relieved of its empty body, and Figure 5 shows the empty body removed and the filled body which has been taken from a wagon now in position on the higway truck in substitution for the empty body; the wagon shown in Figure 2 just after arrival at the transfer means and in Figure 3 ready to depart from same. The truck is shown in Figure 4 just after arrival from the sugar factory, and in Figure 5 ready to depart for the sugar factory;

Figure 6 is a detail view similar to Figure 2, upon an enlarged scale, and partly in section;

Figure 7 shows the construction in Figure 6 looking in the direction of the arrow at the right-hand side thereof;

Figure 8 is a detail fragmentary side elevation of the wagon shown in Figure 6, showing means for positioning and maintaining the vehicle body upon the wagon or truck frame;

Figure 9 is a detail vertical sectional view taken upon the line 9—9, Figure 8, looking in the direction of the appended arrows;

Corresponding parts in all the figures are designated by the same reference characters.

Figure 10:
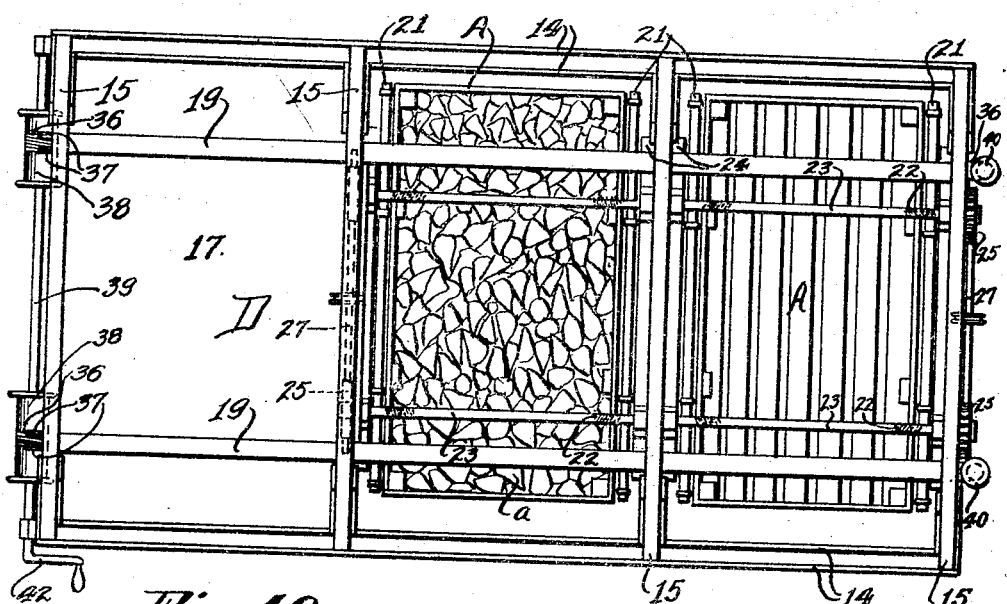
Figure 10 is a top plan view of the transfer means shown in Figures 6 and 7.
Figure 12:
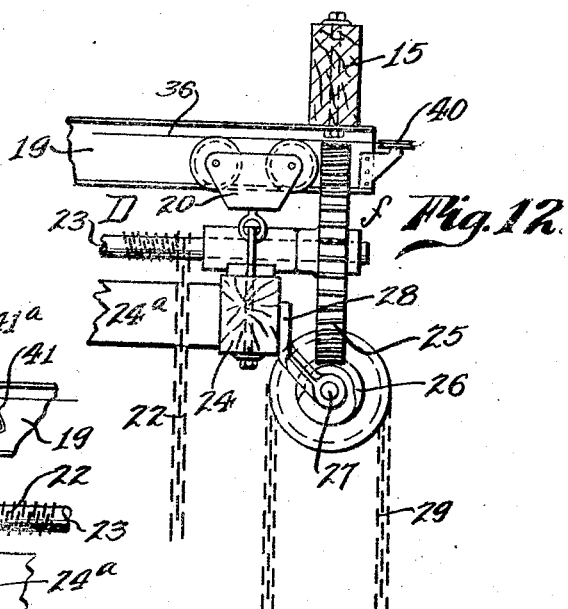
Figure 12 is a further detail elevation of further features shown in Figures 6 and 7.
Figure 11:
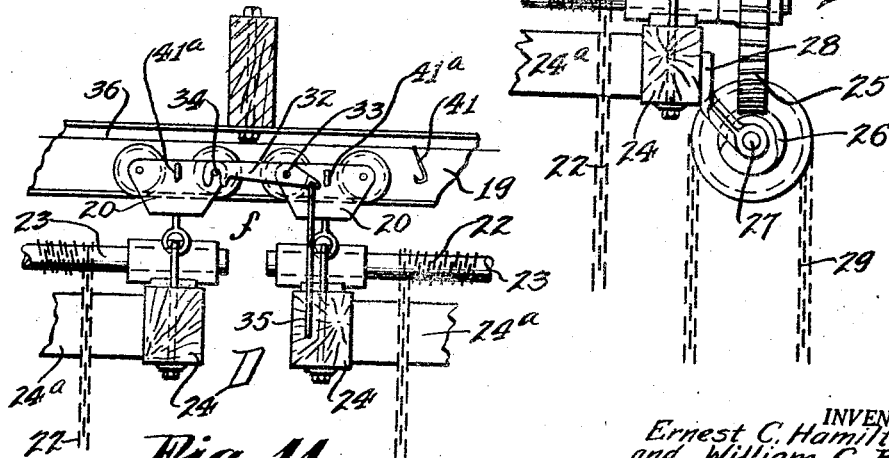
Figure 11 is a detail fragmentary elevation of features shown in Figure 6.

The invention is illustrated in the present case by adaptation to the transportation and transference of ranch, orchard or farm products, specifically sugar beets which are grown in tracts of large acreage and often require to be transported considerable distances to the sugar factory. In the first place, the beets must be collected from fields and then have to be hauled on highways to the factory. The collecting step of the process is slow and is usually accomplished by horse-drawn vehicles of fairly large tonnage, say from six to eight ton capacity. Slow moving road vehicles of this type are not adapted for long hauls on high-speed roads or highways, and neither are motor trucks of the type used for highway hauling adapted for collecting the beets in the soft soggy fields. Therefore, in order to use field wagons and highway trucks to their best advantage and with the highest efficiency, the present invention aims to provide a method wherein the transfer of the beets may be made from the slow field wagons to the faster transporting vehicles in bulk without subjecting the beets to bruising from shoveling or without dumping the beets after having once been placed in the container in the field.

Accordingly, the present method has in view the utilization of relatively slow moving road vehicles and high-speed highway road vehicles adapted for handling the beets in a container whereby the latter may be handled as a complete load thereby effecting the quick transfer from one vehicle to the other, and releasing the field road vehicle for its particular service and utilizing the highway road vehicle to its best advantage. In actual practice it has been found that the utilization of the present method has resulted in the sugar-beet factory being rapidly and fully supplied with beets from the fields many miles distant the wagons being kept in continuous service on the fields and the trucks in continuous service on the highways, thereby effecting considerable economy in time and labor due to employing each vehicle in its own particular zone of service.

Referring with particularity to the drawings, A designates a transferable conveyance member or body adapted to hold a load of beets or other commodities $a$ during the transportation of same upon a highway truck B or a field wagon C or the frame or running gear of each. D designates generally transfer means, in one form, for shifting such conveyance member or body, either when filled from wagon to truck, or when empty from truck to wagon, such transfer means being located upon a field E adjacent to a highway F, the motor truck B being more particularly adapted for traversing said highway and the wagon A for traversing said field. $e$ designates a drive-way or turn-about upon which the trucks and wagons may conveniently approach and leave the transfer means D. Such transfer means as shown in the drawings include an upright frame $d$ having suitable uprights 13, longitudinal members 14 and transverse members 15, and being preferably subdivided to provide an intermediate or middle space 16 where the wagons and trucks are positioned in the load-shifting operations, and side spaces 17 and 18 for accommodating the conveyance members or bodies A during the shifting operations. The bodies may be shifted this way and that by suitable adjustable suspension means $f$ which may be conveniently operated, and which are mounted upon or in connection with the frame $d$. These means are preferably so constructed and organized and controlled that they provide for a simultaneous shifting of a filled body from a wagon and an empty body to a wagon, and the shifting of an empty body from a truck and a filled body to a truck. In the form of construction shown in the drawings, spaced overhead tracks 19 are provided extending lengthwise of the frame $d$, that is, above and across all of the compartments or spaces 16, 17 and 18. Suspended from these tracks by wheeled hangers 20 are pairs of spaced beams 21 for each body to be handled or shifted, such beams being so suspended by chains 22 adapted to be wound about longitudinal spaced shafts 23 journaled on transverse beams 24, two chains for each beam 21. The shafts 23 are provided with fixed worm gears 25 meshing with worms 26 upon a transverse shaft 27 mounted in brackets 28 upon one of the beams 24. A chain hoist 29 is provided for operating the shaft 27 so that the shafts 23 may be turned and each pair of floating beams 21 raised or lowered to raise or lower the respective vehicle body A, which may be attached to such beams 21 by other pendant chains 30 adapted to have hook or other quick detachable engagement, as at 31, with such vehicle body. It will be understood that the same organization of this means for raising and lowering and shifting vehicle bodies is duplicated, as shown in the drawings, particularly in Figure 6 and mounted for operation upon the same tracks 19, and such two raising and lowering and shifting means are adapted to be jointly operated, provision being made for uniting them in tandem, as by a latch 32, which may be pivoted to one such hanger 20, as at 33, and engage with a pin 34 upon the hanger 20 of the next adjacent hoisting and shifting means. This latch may be raised and the said beams disconnected as by a pull rod 35 applied to a projecting end of the latch. The duplication of such shifting and hoisting means is clearly shown in the drawings. Such suspending means may be shifted lengthwise of the frame $d$ by cables 36 each passed over two spaced pulleys 37 at one end of the frame $d$ and then over a drum 38 upon a shaft 39 at the same end of the frame, a pulley 40 being provided to reverse the direction of such cable at the other end of the frame, each said cable being connected with one of the hangers 20 as by a hook 41 to engage eyes $41^a$ on the hangers 20. The shaft 39 is provided with a crank 42 whereby the drums 38 may be turned and the cables shifted to move the hangers 30 on the tracks, and consequently shift the suspension means for the bodies, in either direction lengthwise of the frame $d$.

Stringers or longitudinal frame members or beams 43 of the wagons and trucks are preferably provided with transverse frame members or stops 44 co-acting with transverse body members 45 which are adapted to rest upon the stringers 43, preventing endwise shifting of each body. Transverse shifting is prevented by the adjustable means G consisting preferably of angled rods 46 mounted in brackets 47 upon one of such beams 45 and adapted to be swung upwardly or downwardly into position between the stringers 43, by means of an end member or handle 48.

It should be noted that the transverse beams 24 are preferably connected by longitudinal beams 24ª so as to provide frames for each of the suspending and shifting means.

In practice it will be understood that the chain hoists 29 are employed to raise and lower the vehicle bodies or members A, both empty and full, in transferring the full bodies from the wagons to the trucks and empty bodies from the trucks to the wagons. A wagon drives in to the transfer means D, so that its loaded body A may be shifted to the left, at the same time bringing an empty body into position over the wagon, as shown in Figure 3. The wagon drives away, the truck comes in, as shown in Figure 4, and its empty body is shifted over to the position shown in Figure 5, and a filled body, left by the wagon, taken on to the truck. This leaves the empty body in the position shown in Figure 2, to be substituted for the next filled body brought in by the next wagon.

Operating the chain hoist 29 and the cables 36 causes the raising and lowering, and shifting of the bodies in the manner and sequence specified.

As shown in Figure 7, longitudinal planks or beams or stops 49 may be placed across the central frame space 16, against which wheels of the respective vehicles may be brought to rest to properly position said vehicles respectively within the frame d for the shifting operation.

It is obvious that many variations and changes, adaptations and modifications may be made in adapting the invention to varying conditions of use and service, and in practicing it in various aspects, without departing from the true spirit of the invention.

Have thus disclosed our invention, we claim and desire to secure by Letters Patent:

1. A continuous method of transporting products from the growing field to destination which consists first in placing the product in a bulk container on a low speed road vehicle operating in the field, moving said vehicle to a transfer apparatus located at a point adjacent a highway, then operating said apparatus to bodily transfer the loaded bulk container from the low-speed vehicle to the relatively high-speed vehicle and during the said transfer operation to place an empty container on the low-speed vehicle, and subsequently operating the relatively high-speed road vehicle with its loaded bulk container to the point of destination.

2. The method of transferring field products from the field to destination which consists first in placing the product in a bulk container on a low speed vehicle operating in the field, moving said vehicle to a transfer apparatus located at a point adjacent a highway, then operating the said apparatus to remove the loaded container from the low-speed vehicle, placing an empty container upon the low-speed vehicle in substitution for the removed loaded bulk container, transferring an empty bulk container from a high speed vehicle and replacing the same with the loaded bulk container previously removed from the low-speed vehicle, and subsequently operating the high-speed vehicle with its loaded bulk container to the point of destination.

3. The method of transferring perishable product in bulk containers from a low-speed road vehicle to a high-speed road vehicle and while the product is in transit from the point of origin thereof to a point of destination, consisting in providing connecting road sections with a loop adjacent the point of connection, there being a fixed transfer station bridging one of the road sections and a portion of the loop, delivering the product in the low-speed road vehicle to the station in a bulk container over one of the road sections, moving an empty container from the station and placing the same upon the low-speed vehicle in substitution for the removed bulk container, then moving the low-speed vehicle away from the station, moving the high speed vehicle from the other road section around the loop and causing the same to follow after the low-speed vehicle under the station and bringing the same to a stop at the point where the transfer was effected upon the low-speed vehicle, next transferring from the high-speed vehicle an empty container and depositing the same at the station and then transferring the previously deposited product bulk container from the station to the high-speed vehicle, and finally moving the high speed vehicle from the station and loop over the said other road section.

In testimony whereof, we have signed our names to this specification.

ERNEST C. HAMILTON.
WILLIAM C. POE.